United States Patent
Sumitomo et al.

(10) Patent No.: US 9,544,342 B2
(45) Date of Patent: Jan. 10, 2017

(54) DIGITAL MEDIA PLAYBACK INSTRUCTION DISTRIBUTION DEVICE, METHOD, AND PROGRAM THAT CALCULATE A DIGITAL MEDIA PLAYBACK DELAY AND DISTRIBUTE A DELAY INSTRUCTION WITH WEBSITE CONTENT

(71) Applicant: YAHOO JAPAN CORPORATION, Tokyo (JP)

(72) Inventors: Eiji Sumitomo, Tokyo (JP); Kanta Suzuki, Tokyo (JP); Kazutaka Kimura, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 408 days.

(21) Appl. No.: 14/326,875

(22) Filed: Jul. 9, 2014

(65) Prior Publication Data
US 2015/0088963 A1    Mar. 26, 2015

(30) Foreign Application Priority Data
Sep. 20, 2013 (JP) ................................ 2013-195696

(51) Int. Cl.
| G06Q 30/00 | (2012.01) |
| G06F 15/16 | (2006.01) |
| H04L 29/06 | (2006.01) |
| G06Q 30/02 | (2012.01) |
| H04L 29/08 | (2006.01) |
| G06F 17/30 | (2006.01) |

(52) U.S. Cl.
CPC ..... *H04L 65/4015* (2013.01); *G06F 17/30905* (2013.01); *G06Q 30/0241* (2013.01); *G06Q 30/0277* (2013.01); *H04L 65/4092* (2013.01); *H04L 67/02* (2013.01); *H04L 67/16* (2013.01)

(58) Field of Classification Search
None
See application file for complete search history.

(56) References Cited

U.S. PATENT DOCUMENTS

2002/0032608 A1*  3/2002  Kanter ................... G06Q 30/02
                                                    705/14.39
2008/0288342 A1* 11/2008  Ingleshwar ............ G06Q 30/02
                                                    705/14.54
(Continued)

FOREIGN PATENT DOCUMENTS

JP    A-2011-128204    6/2011

*Primary Examiner* — David Lazaro
*Assistant Examiner* — Julian Chang
(74) *Attorney, Agent, or Firm* — Oliff PLC

(57) ABSTRACT

Digital media playback instruction distribution devices, methods, and programs access a memory storing content data, the content data including website content for distribution to a remote terminal, the website content including a display area for displaying digital media. The devices, methods, and programs receive a request for the stored web content from the remote terminal, calculate a time period over which a user of the remote terminal is estimated to need to browse the website content when it is rendered on the remote terminal, and transmit the website content and a delay instruction to the remote terminal, the delay instruction instructing the remote terminal to delay playback of digital media displayed in the display area until after the calculated time period has elapsed since display of the website content on the remote terminal.

16 Claims, 9 Drawing Sheets

(56) References Cited

U.S. PATENT DOCUMENTS

| | | | | |
|---|---|---|---|---|
| 2008/0320394 A1* | 12/2008 | Womack | ............ | G06Q 30/0277 |
| | | | | 715/730 |
| 2010/0211459 A1* | 8/2010 | Seeman | ............ | G06F 17/30899 |
| | | | | 705/14.46 |
| 2011/0225054 A1* | 9/2011 | Morris | .................... | G06Q 30/02 |
| | | | | 705/14.73 |
| 2014/0082659 A1* | 3/2014 | Fife | .................. | H04N 21/25891 |
| | | | | 725/32 |
| 2014/0208199 A1* | 7/2014 | Peleg | ................. | G06Q 30/0277 |
| | | | | 715/234 |
| 2014/0215341 A1* | 7/2014 | Fratti | ................ | G06F 17/30056 |
| | | | | 715/730 |
| 2014/0236734 A1* | 8/2014 | Singhal | .............. | G06Q 30/0272 |
| | | | | 705/14.68 |
| 2015/0295799 A1* | 10/2015 | Gayles | ............... | H04L 43/067 |
| | | | | 702/176 |
| 2015/0317678 A1* | 11/2015 | Huang | ............... | G06Q 30/0241 |
| | | | | 705/14.54 |

* cited by examiner

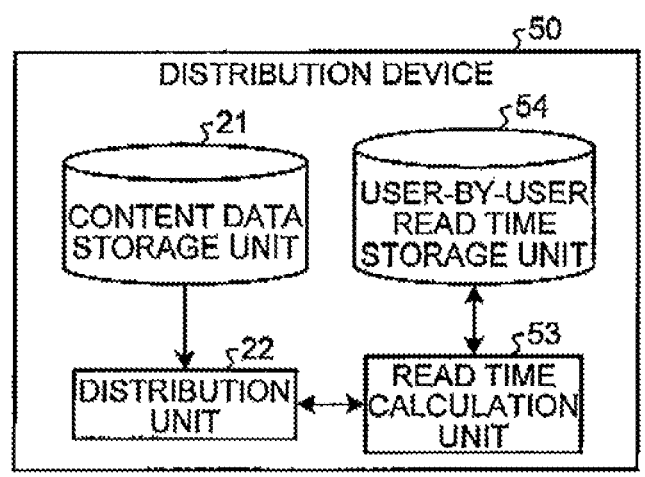

DIGITAL MEDIA PLAYBACK INSTRUCTION DISTRIBUTION DEVICE, METHOD, AND PROGRAM THAT CALCULATE A DIGITAL MEDIA PLAYBACK DELAY AND DISTRIBUTE A DELAY INSTRUCTION WITH WEBSITE CONTENT

CROSS-REFERENCE TO RELATED APPLICATION(S)

The present application claims priority to and incorporates by reference the entire contents of Japanese Patent Application No. 2013-195696 filed in Japan on Sep. 20, 2013.

BACKGROUND OF THE INVENTION

1. Field of the Invention

The present invention relates to a distribution device, a distribution method, and a non-transitory computer readable storage medium.

2. Description of the Related Art

Japanese Patent Application Laid-open No. 2011-128204 discloses an advertisement distribution device that causes a video to be played back on a display area for a video when a viewable area that is displayed on a screen of a web browser in an area of a content such as a web page includes a reference position set in the display area.

In the technique as disclosed in Japanese Patent Application Laid-open No. 2011-128204, for example, when the display area for displaying a video is present beside an article in the web page, the video is played back on the display area in some cases although a user such as a visitor of the web page has not finished reading the article, resulting in a problem. Thus, in the technique as disclosed in Japanese Patent Application Laid-open No. 2011-128204, it is still difficult to play back the video at an appropriate timing.

SUMMARY OF THE INVENTION

It is an object of the present invention to at least partially solve the problems in the conventional technology.

Exemplary embodiments provide digital media playback instruction distribution devices, methods, and programs that access a memory storing content data, the content data including website content for distribution to a remote terminal, the website content including a display area for displaying digital media. The devices, methods, and programs receive a request for the stored web content from the remote terminal, calculate a time period over which a user of the remote terminal is estimated to need to browse the website content when it is rendered on the remote terminal, and transmit the website content and a delay instruction to the remote terminal, the delay instruction instructing the remote terminal to delay playback of digital media displayed in the display area until after the calculated time period has elapsed since display of the website content on the remote terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a block diagram illustrating an example of the functional configuration of a distribution device according to a second embodiment;

FIG. 9 is a view illustrating an example of a data structure that is stored in a user-by-user read time storage unit;

DETAILED DESCRIPTION OF THE PREFERRED EMBODIMENTS

First Embodiment

The description begins with a first embodiment will be described with reference to the accompanying drawings.

Outline of Processing

Figure 1:
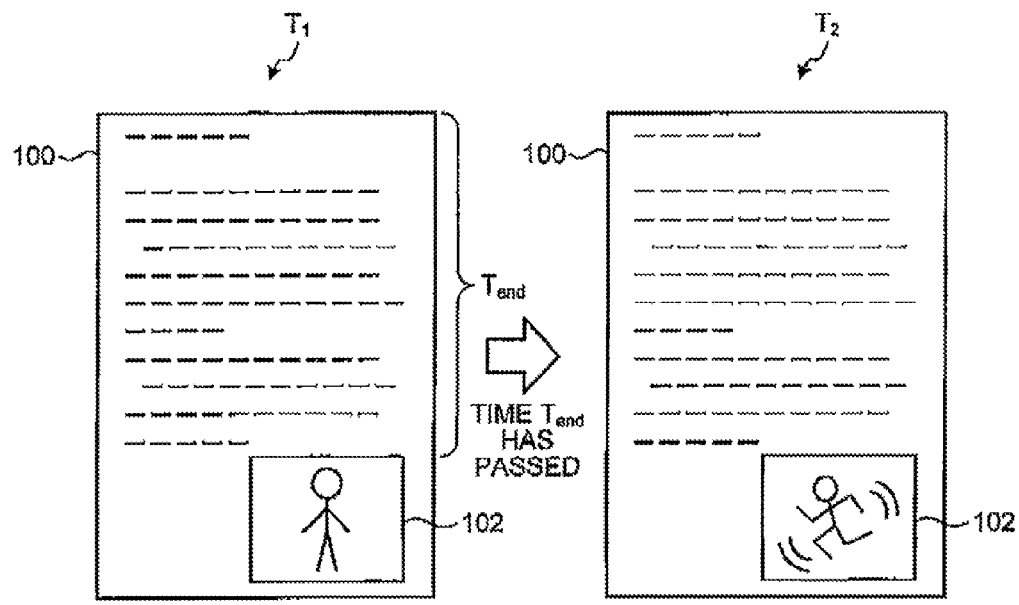
FIG. 1 is a conceptual view for explaining an example of outline of processing according to a first embodiment.

FIG. 1 is a conceptual view for explaining an example of outline of processing in the first embodiment.

A user terminal acquires content data distributed from a distribution device and creates a content 100 based on the acquired content data. Then, the user terminal displays the created content 100 on a screen of the user terminal. The content 100 in the embodiment includes a display area 102 for a video and a video is displayed on the display area 102. In the embodiment, the video that is played back in the display area 102 of the content 100 is a video advertisement, for example.

In the embodiment, the content data that is distributed to the user terminal from the distribution device includes a content control program. In the embodiment, the content 100 is a Web content, for example. The content control program is JavaScript (registered trademark), for example. The user terminal executes the content control program so as to control playback of the video advertisement in the display area 102. The distribution device calculates a time $T_{end}$ to the time at which a user is estimated to finish reading a document included in the content from the time at which the content based on the content data is displayed on the user terminal. Then, the distribution device adds the calculated time $T_{end}$ to the content data that is distributed to the user terminal, and distributes the content data including the time $T_{end}$ to the user terminal.

At a time $T_1$ in FIG. 1, the user terminal displays an area in the content 100 on the screen of the user terminal. At this stage, the video advertisement is not played back on the display area 102. The user terminal acquires the time $T_{end}$ included in the content data.

When an elapsed time since display of the content 100 started on the screen reaches the time $T_{end}$, the user terminal causes the video advertisement to be played back on the display area 102 as in a state at a time $T_2$ in FIG. 1, for example. When the video advertisement is a video with sound, the user terminal causes the video to be played back in the display area 102 and causes the sound to be played back.

According to the embodiment, the video advertisement can be played back at a timing at which the user is estimated to finish reading the document included in the content. In other words, according to the embodiment, the video can be played back at an appropriate timing.

Configurations of Distribution System 10 and Distribution Device 20

Figure 2:
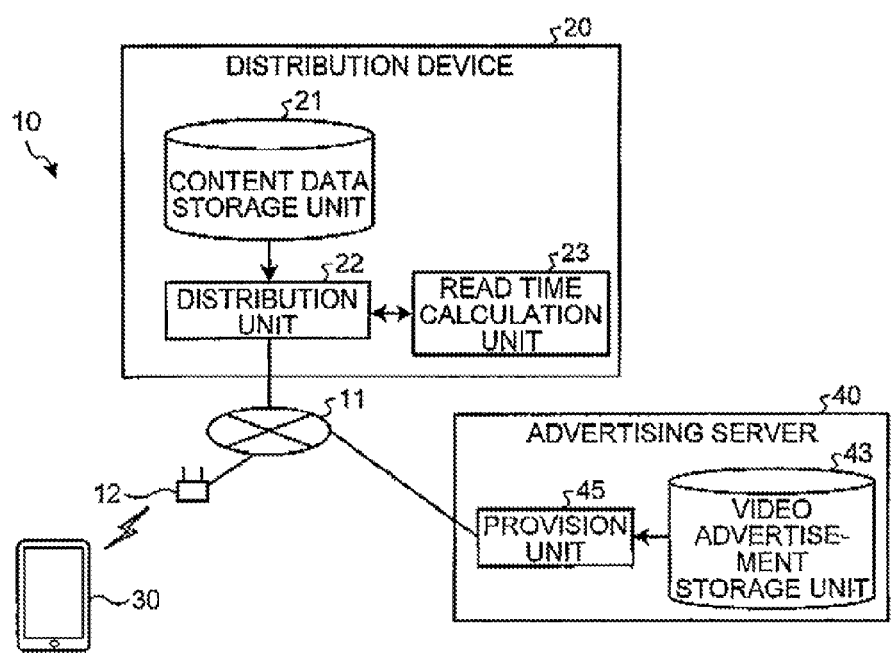
FIG. 2 is a system configuration diagram illustrating an example of a distribution system in the first embodiment.

FIG. 2 is a system configuration diagram illustrating an example of a distribution system in the first embodiment. A distribution system 10 in the embodiment includes a distribution device 20, a user terminal 30, and an advertising server 40. The distribution device 20 and the advertising server 40 are connected to a communication circuit 11 and can transmit and receive communication data through the communication circuit 11.

Figures 3, 4:
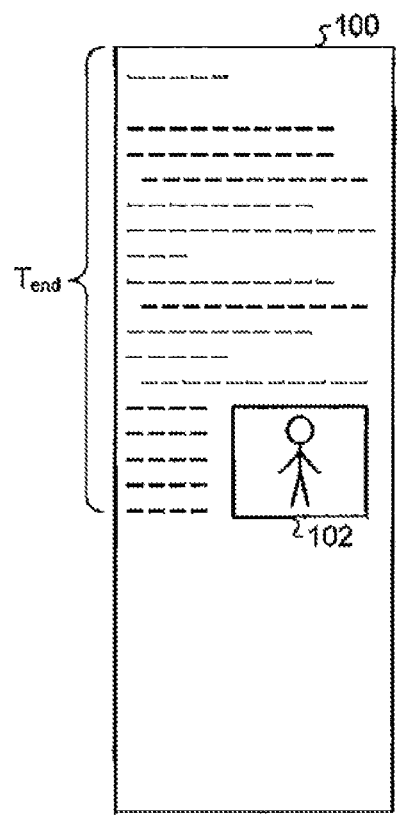
FIG. 3 is a view illustrating an example of a data structure that is stored in a content data storage unit.
FIG. 4 is a conceptual view illustrating an example of a content structure.

The distribution device 20 includes a content data storage unit 21, a distribution unit 22, and a read time calculation unit 23. FIG. 3 is a view illustrating an example of a data structure that is stored in the content data storage unit. As illustrated in FIG. 3, for example, the content data storage unit 21 stores therein pieces of content data 211 in association with URLs 210 indicating access destinations of the respective pieces of content data 211. FIG. 3 illustrates the content data storage unit 21 that stores therein the content data 211 of "content 1" in association with the URL 210 of "http://www.abcde.co.jp/xxx/" in a first record.

When the distribution unit 22 receives a URL transmitted from the user terminal 30, it acquires, as content data (content data that is distributed to the user terminal 30) serving as a distribution target, the content data corresponding to the received URL from the content data storage unit 21. Subsequently, the distribution unit 22 transmits the content data serving as the distribution target to the read time calculation unit 23. When the distribution unit 22 receives a time $T_{end}$, which will be described later, from the read time calculation unit 23, it adds the received time $T_{end}$ to the content data serving as the distribution target, and distributes the content data including the time $T_{end}$ to the user terminal 30.

The data structure of the content 100 in the embodiment is described. FIG. 4 is a conceptual view illustrating an example of a content structure. The content 100 in the embodiment includes the display area 102 on which a video such as a video advertisement is played back and the display area 102 is associated with a video advertisement area ID indicating that it is an area for displaying the video advertisement. The content data includes information of the video advertisement area ID. In the following description, the video advertisement area ID is abbreviated to be referred to as an area ID in some cases.

The content 100 in the embodiment includes the time $T_{end}$ calculated by the read time calculation unit 23. For example, when the read time calculation unit 23 receives the content data serving as the distribution target from the distribution unit 22, it counts the number of characters included in the received content data. The characters referred herein are characters from the head of the content based on the content data to the display area 102 on which the video is played back, for example. The read time calculation unit 23 calculates the time $T_{end}$ to the time at which the user is estimated to finish reading the document included in the content from the time at which the content based on the content data is displayed on the user terminal 30 by multiplying the counted number of characters by a previously defined time a that is required for a user to read one character. Then, the read time calculation unit 23 transmits the calculated time $T_{end}$ to the distribution unit 22. The distribution unit 22 adds the received time Td to the content data that is distributed to the user terminal 30, and distributes the content data including the time $T_{end}$ to the user terminal 30.

The advertising server 40 includes a video advertisement storage unit 43 and a provision unit 45.

Figure 5:
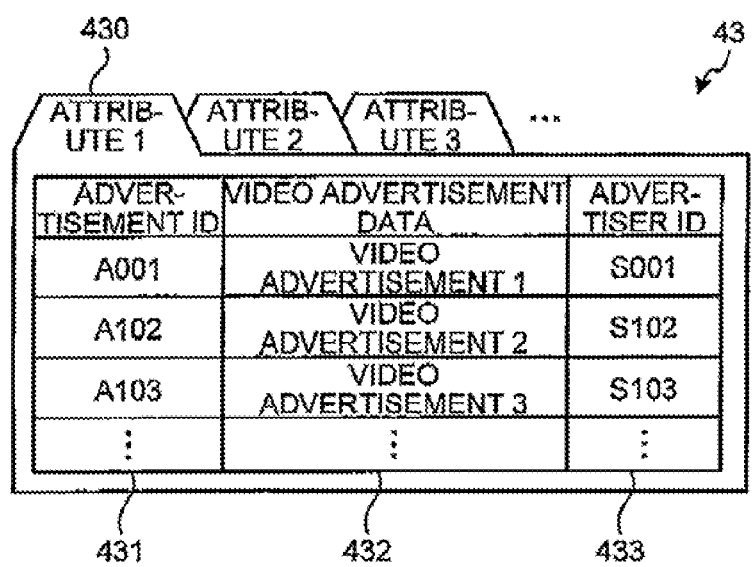
FIG. 5 is a view illustrating an example of a data structure that is stored in a video advertisement storage unit.

FIG. 5 is a view illustrating an example of a data structure that is stored in the video advertisement storage unit. As illustrated in FIG. 5, for example, the video advertisement storage unit 43 stores therein advertisement data tables for respective pieces of attribute information 430 each indicating an attribute of the user of the user terminal 30. Each advertisement data table includes pieces of video advertisement data 432 and advertiser IDs 434 in association with advertisement IDs 431.

The advertisement ID is information for identifying each advertisement. The attribute information includes age, sex, nationality, and the like of the user, for example. The attribute information may include information such as specification and performance of the user terminal 30 that is used by the user additionally. The advertiser ID is information for identifying an advertiser of each advertisement. In the following description, the video advertisement data is referred to as advertisement data simply in some cases.

FIG. 5 illustrates the advertisement data table that is associated with the attribute information 430 of "attribute 1". The advertisement data table as illustrated in FIG. 5 stores therein the video advertisement data 432 of "video advertisement 1" and the advertiser ID 433 of "S001" in association with the advertisement ID 431 of "A001".

Description is continued with reference to FIG. 2 again. When the provision unit 45 receives an advertising request having the attribute information of the user and equal to or more than one video advertisement area ID(s) from the user terminal 30 through the communication circuit 11, it extracts the advertisement ID and the video advertisement data associated with the advertisement ID from the advertisement data table corresponding to the attribute information included in the received advertising request by referring to the video advertisement storage unit 43. Then, the provision unit 45 transmits the advertisement ID and the video advertisement data to the user terminal 30 through the communication circuit 11 for each area ID included in the advertising request.

Configuration of User Terminal 30

Figure 6:
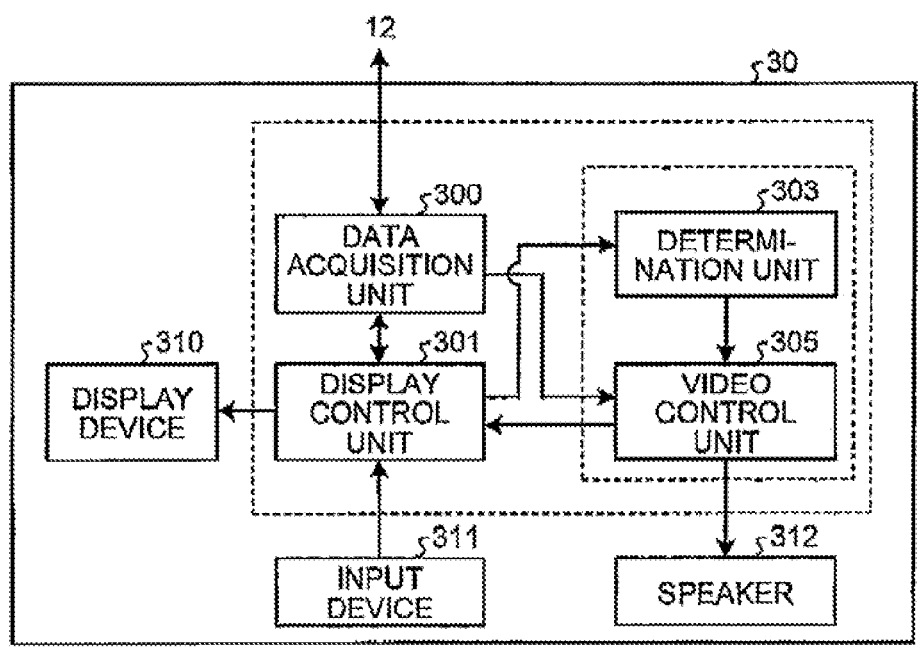
FIG. 6 is a block diagram illustrating an example of the functional configuration of a user terminal in the first embodiment.

The user terminal 30 is a mobile personal computer (PC), a personal digital assistant (PDA), a smart phone, or the like that is used by the user, and a browser application (for example, browser program) is installed on the user terminal 30. In the embodiment, a standard browser program that is installed on the user terminal 30 interprets and executes the control program such as JavaScript. Various applications capable of displaying Web contents are installed on the smart device such as the smart phone in addition thereto in some cases. These applications may interpret and execute the control program such as JavaScript so as to cause the user terminal 30 to execute functions based on the control program. FIG. 6 is a block diagram illustrating an example of the functional configuration of the user terminal in the first embodiment. The user terminal 30 in the embodiment includes a data acquisition unit 300, a display control unit 301, a determination unit 303, a video control unit 305, a display device 310, an input device 311, and a speaker 312.

The browser program that is executed by an arithmetic device in the user terminal 30 causes the data acquisition unit 300, the display control unit 301, the determination unit 303, and the video control unit 305 to function among the functions of the user terminal 30.

In particular, the browser program executes the content control program that is included in the content data distributed from the distribution device 20 so as to cause the determination unit 303 and the video control unit 305 to function.

The data acquisition unit 300 transmits the URL of the content data to the distribution device 20 through the communication circuit 11 and acquires the content data from the distribution device 20 through the communication circuit 11. Then, the data acquisition unit 300 analyzes the acquired content data so as to extract the area ID of the area included in the content 100 that is created.

Subsequently, the data acquisition unit 300 transmits an advertising request including the attribute information of the user of the distribution system 10 and the extracted area ID to the advertising server 40 through the communication circuit 11. As the attribute information of the user, a Hyper-Text Transfer Protocol cookie (HTTP cookie) that is stored in the user terminal 30 can be used.

Then, the data acquisition unit 300 receives pieces of information of the advertisement ID and the advertisement data for each area ID from the advertising server 40 through the communication circuit 11. The data acquisition unit 300 transmits the content data to the display control unit 301.

The display control unit 301 constructs the content 100 based on the content data received from the data acquisition unit 300. The display control unit 301 extracts the time $T_{end}$ included in the content data and transmits the extracted time $T_{end}$ to the determination unit 303. In addition, the display control unit 301 transmits a message indicating that display of the content 100 is started to the determination unit 303 at a timing at which the content 100 is displayed on the display device 310. This enables the determination unit 303 to grasp the timing at which the display of the content 100 is started.

The display control unit 301 specifies a viewable area in the content 100 in accordance with an operation by the user that has been received through the input device 311 such as a touch panel. In the following description, an area that is displayed on the screen of the user terminal 30 in the area in the content 100 is referred to as a viewable area. The display control unit 301 transmits image data of the content 100 included in the specified viewable area to the display device 310. When the display control unit 301 receives frame data of the played back video advertisement together with the area ID from the video control unit 305, the display control unit 301 performs mapping of an image of the received frame data on the display area 102 corresponding to the received area ID and transmits it to the display device 310. The display device 310 is a liquid crystal panel, for example, and displays an image based on the data received from the display control unit 301.

The viewable area is described. The viewable area is an area included in the display area that is displayed by the browser program and included in the display area on the screen of the user terminal 30 in the area of the content 100. The first embodiment is not limited thereto and, for example, an area included in the display area that is displayed by the browser program in the area of the content 100 may be set to the viewable area.

The display control unit 301 acquires positional information indicating the position and the size of the viewable area from an operating system (OS), for example. The display control unit 301 converts the positional information of the viewable area into coordinates in the content 100, for example, and manages them.

The determination unit 303 repeatedly determines whether the time $T_{end}$ has passed from the start of the display of the content 100 until it determines that the time $T_{end}$ has passed while being triggered by transmission of the time $T_{end}$ from the display control unit 301. That is to say, the determination unit 303 repeatedly determines whether an estimated time required for the user operating the user terminal 30 to brows the document included in the content 100 has passed since display of the content 100 started.

When the determination unit 303 determines that the time $T_{end}$ has passed from the start of the display of the content 100, it receives the advertisement ID, the video advertisement data, and related information for each area ID from the display control unit 301, and transmits the received area ID, and the advertisement ID, the video advertisement data, and the related information corresponding to the area ID to the video control unit 305. When the video control unit 305 receives the area ID from the determination unit 303, it starts playback of the video advertisement data corresponding to the received area ID.

For example, the video control unit 305 decodes the video advertisement data and transmits frame data together with the area ID to the display control unit 301 so as to start playback of the video advertisement. When the video advertisement is a video with sound, the video control unit 305 also decodes the sound and outputs the decoded sound through the speaker 312.

Operations of User Terminal

Figure 7:
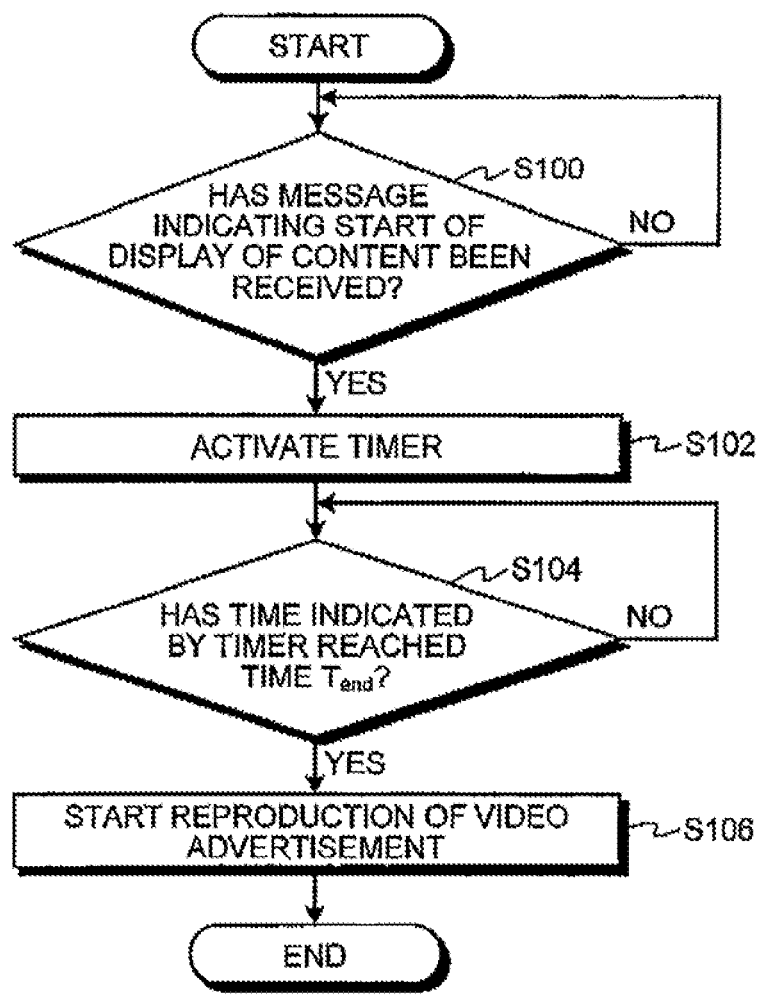
FIG. 7 is a flowchart illustrating an example of operations of the user terminal in the first embodiment.

FIG. 7 is a flowchart illustrating an example of operations of the user terminal in the first embodiment. The user terminal 30 acquires the content data from the distribution device 20 and reads the content control program included in the acquired content data so as to start operations as illustrated in the flowchart.

First, the determination unit 303 determines whether it has received the message indicating start of the display of the content 100 from the display control unit 301 (S100). When the determination unit 303 has not received the message (No at S100), the determination unit 303 performs the processing at S100, again.

On the other hand, when the determination unit 303 has received the message (Yes at S100), the determination unit 303 activates a timer for measuring a time (S102). This can measure a time from the start of the display of the content 100 by the timer. Then, the determination unit 303 determines whether a time indicated by the timer has reached the time $T_{end}$ (S104). When the time Ted has not passed (No at S104), the determination unit 303 executes the processing at S104, again. On the other hand, when the time $T_{end}$ has passed (Yes at S104), the determination unit 303 transmits the area ID corresponding to the display area 102 included in the viewable area to the video control unit 305. The video control unit 305 starts playback of the video advertisement data corresponding to the area ID received from the determination unit 303 (S106). When the video control unit 305 has already played back a part of the video advertisement, it may play back the remaining video advertisement or may play back the video advertisement from the beginning again.

The first embodiment has been described above.

As described above, the distribution system 10 in the embodiment enables the video advertisement to be played back at the timing at which the user is estimated to finish reading the document included in the content. In other words, the distribution system 10 in the embodiment enables a video to be played back at an appropriate timing.

Furthermore, the distribution system 10 in the embodiment calculates the time $T_{end}$ using the previously defined read time at per character, thereby controlling playback of the video with a simple method.

Second Embodiment

Next, a second embodiment is described with reference to the drawings. In the following description, the same reference numerals as those in the first embodiment denote the configurations having similar or the same functions as those in the first embodiment and description thereof is omitted in some cases. A distribution system in the second embodiment includes a distribution device 50 instead of the distribution device 20 in the first embodiment.

Configuration of Distribution Device 50

FIG. 8 is a block diagram illustrating an example of the functional configuration of the distribution device in the second embodiment. The distribution device 50 in the embodiment is different from the distribution device 20 in the above-mentioned first embodiment in that the distribution device 50 includes a read time calculation unit 53 instead of the read time calculation unit 23 and includes a user-by-user read time storage unit 54.

In the distribution system in the embodiment, a time required for the user to read one character that is used for calculating the time $T_{end}$ is different from that in the first embodiment. In the distribution system in the embodiment, the time Tea is calculated using a time required to read one character that corresponds to a user fox each user of the user terminal 30. Thus, in the distribution system in the embodiment, the time $T_{end}$ specific to the user is calculated, so that the timing at which the video advertisement is played back is a timing appropriate for the user. With this, the distribution system in the embodiment enables the video to be played back at a further appropriate timing.

In the embodiment, the user terminal 30 measures a time $T_{close}$ until the user closes a screen for a content since the content is displayed on the screen of the user terminal 30, and transmits the measured time, the URL corresponding to the content, and the user ID of the user of the user terminal 30 to the distribution device 50.

FIG. 9 is a view illustrating an example of a data structure that is stored in the user-by-user read time storage unit. As illustrated in FIG. 9, the user-by-user read time storage unit 54 stores therein the read time per character in association with each user ID that is an ID of the user of the user terminal 30.

A first record in the user-by-user read time storage unit 54 as illustrated in FIG. 9 indicates that the read time per character for a user of which the user ID is "AAA" is 0.2 second. A second record indicates that the read time per character for a user of which the user ID is "BBB" is 0.15 second.

The read time calculation unit 53 calculates the read time per character for the user using the time $T_{close}$, the URL corresponding to the content, and the user ID that have been received from the user terminal 30, as will be described later. That is to say, first, the read time calculation unit 53 acquires content data corresponding to the received URL from the content data storage unit 21. Next, the read time calculation unit 53 counts the number of characters that are included in the acquired content data. The read time calculation unit 53 calculates the read time per character for the user indicated by the received user ID by dividing the received time $T_{close}$ by the counted number of characters. Thereafter, the read time calculation unit 53 stores the calculated read time and the user ID in the user-by-user read time storage unit 54 in an associated manner. In this manner, the read time calculation unit 53 stores the read time per character for the user in the user-by-user read time storage unit 54 in association with the user ID.

When the read time calculation unit 53 receives the content data serving as the distribution target from the distribution unit 22, it counts the number of characters included in the received content data. The characters referred herein are characters from the head of the content based on the content data to the display area 102 on which the video is played back, for example. The read time calculation unit 53 acquires the read time corresponding to the user ID of the user terminal 30 serving as a target to which the content data is distributed from the user-by-user read time storage unit 54. Then, the read time calculation unit 53 calculates a time $T_{end}$ to the time at which the user is estimated to finish reading the document included in the content from the time at which the content based on the content data is displayed on the user terminal 30 by multiplying the counted number of characters by the acquired read time. Thereafter, the read time calculation unit 53 transmits the calculated time $T_{end}$ to the distribution unit 22. The distribution unit 22 adds the received time $T_{end}$ to the content data that is distributed to the user terminal 30, and distributes the content data including the time Tea to the user terminal 30.

The second embodiment has been described above.

As described above, the distribution system in the embodiment calculates the time $T_{end}$ using a time required to read one character that corresponds to a user for each user of the user terminal 30. Thus, in the distribution system in the embodiment, the time $T_{end}$ specific to the user is calculated, so that the timing at which the video advertisement is played back is a timing appropriate for the user. With this, the distribution system in the embodiment enables the video to be played back at a further appropriate timing.

Figure 10:
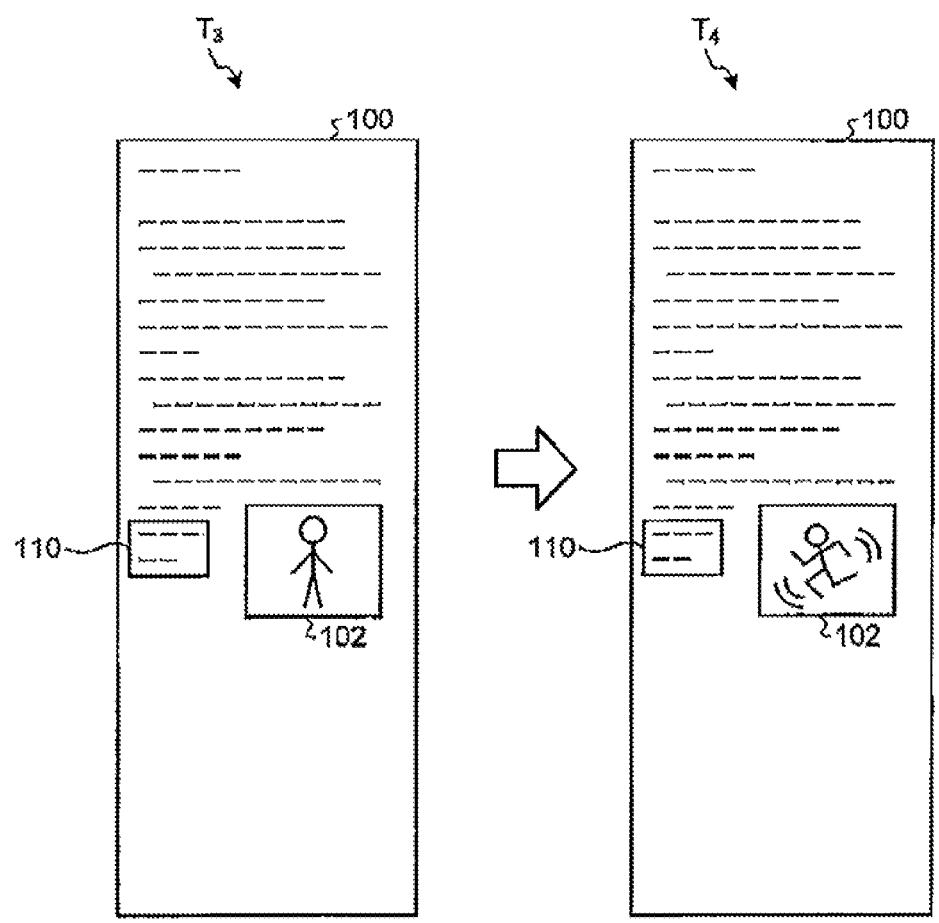
FIG. 10 is a view for explaining another processing that is executed by a read time calculation unit.

When a thumbnail image is present in the content 100, the user only views the thumbnail image without reading the document in the content 100 and shifts to a subsequent content in some cases. In this case, because the user has not read the document, playback of the video advertisement is preferably started immediately when the content 100 is displayed on the user terminal 30. The read time calculation unit in the above-mentioned first embodiment and second embodiment can also determine whether a thumbnail image is present in the content 100 based on the content data serving as the distribution target. When the thumbnail image is present, the read time calculation unit can calculate the time $T_{end}$ to be "0" second or a numerical value (for example, "0.1" second) close to 0. As illustrated in FIG. 10, when the content 100 including a thumbnail image 110 is displayed on the user terminal 30 at a time $T_3$, a video advertisement is played back on the display area 102 at a time $T_4$ that is substantially the same as the time $T_3$. Accordingly, the video can be played back at an appropriate timing for the user who views only the thumbnail image and shifts to the subsequent content when the thumbnail image is present in the content 100.

Figure 11:
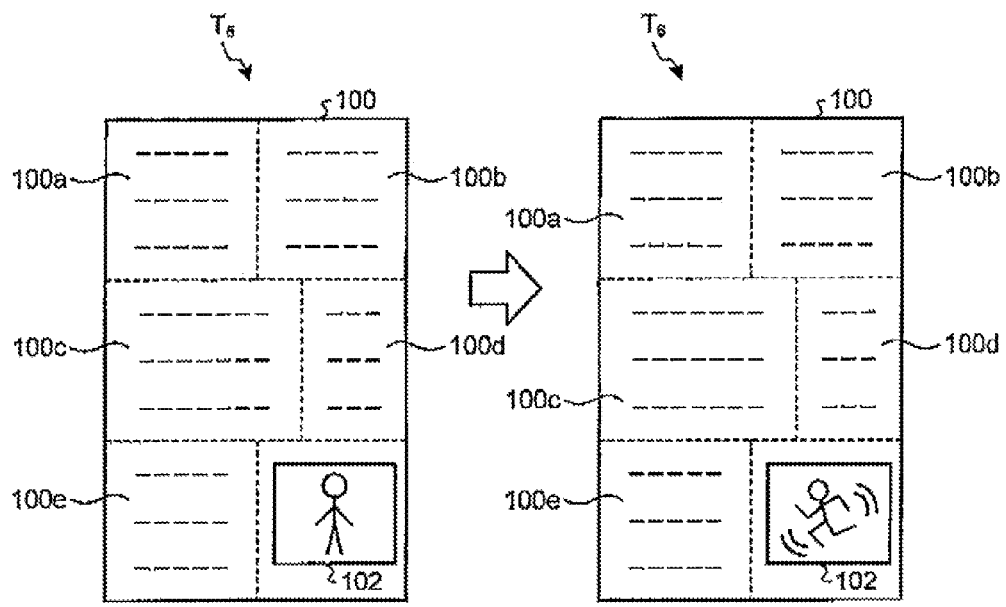
FIG. 11 is a view for explaining another processing that is executed by the read time calculation unit.

When there are a plurality of articles in the content 100, the user reads only an exclusive article among the articles and shifts to another content in some cases. In this case, when the content 100 is displayed on the user terminal 30, the playback of the video advertisement is preferably started at a timing at which the user finishes reading the exclusive article. The read time calculation unit in the above-mentioned first embodiment and second embodiment can also determine whether there are a plurality of articles in the content 100 based on the content data serving as the distribution target. When there are the plurality of articles, the read time calculation unit can specify an article having the largest number of characters as the exclusive article and calculate the time $T_{end}$ by multiplying the number of characters of the specified exclusive article by the read time per character. With this, as illustrated in FIG. 11, when the content 100 including a plurality of articles 100a to 100e is displayed on the user terminal 30 at a time $T_5$, the video advertisement is played back on the display area 102 at a time $T_6$ at which the time $T_{end}$ required for the user to browse the article 100c having the largest number of characters and considered to be the exclusive article has passed from the time $T_5$. Accordingly, the video can be played back at an appropriate timing for the user who reads only the exclusive article and shifts to another content.

The determination unit 303 and the video control unit 305 in the first embodiment and the second embodiment can perform various pieces of processing in addition to the above-mentioned pieces of processing. The content 100 is a content that is displayed in a timeline format and reload of the content 100 is started with an operation by the user in some cases. The start of the reload indicates that the user has browsed previous matters of the content highly possibly. When the video advertisement is played back on a subsequent portion on the reloaded content, there is a high possibility that the user will view the video advertisement. Based on this, the determination unit 303 determines whether the subsequent matters of the content have been reloaded. When it is determined that the subsequent matters of the content have been reloaded, the video control unit 305 starts playback of the video advertisement on a predetermined portion (for example, head portion) of the reloaded subsequent matters of the content. This enables the user terminal 30 to play back the video advertisement under a condition where the user views the video advertisement highly possibly.

Figure 12:
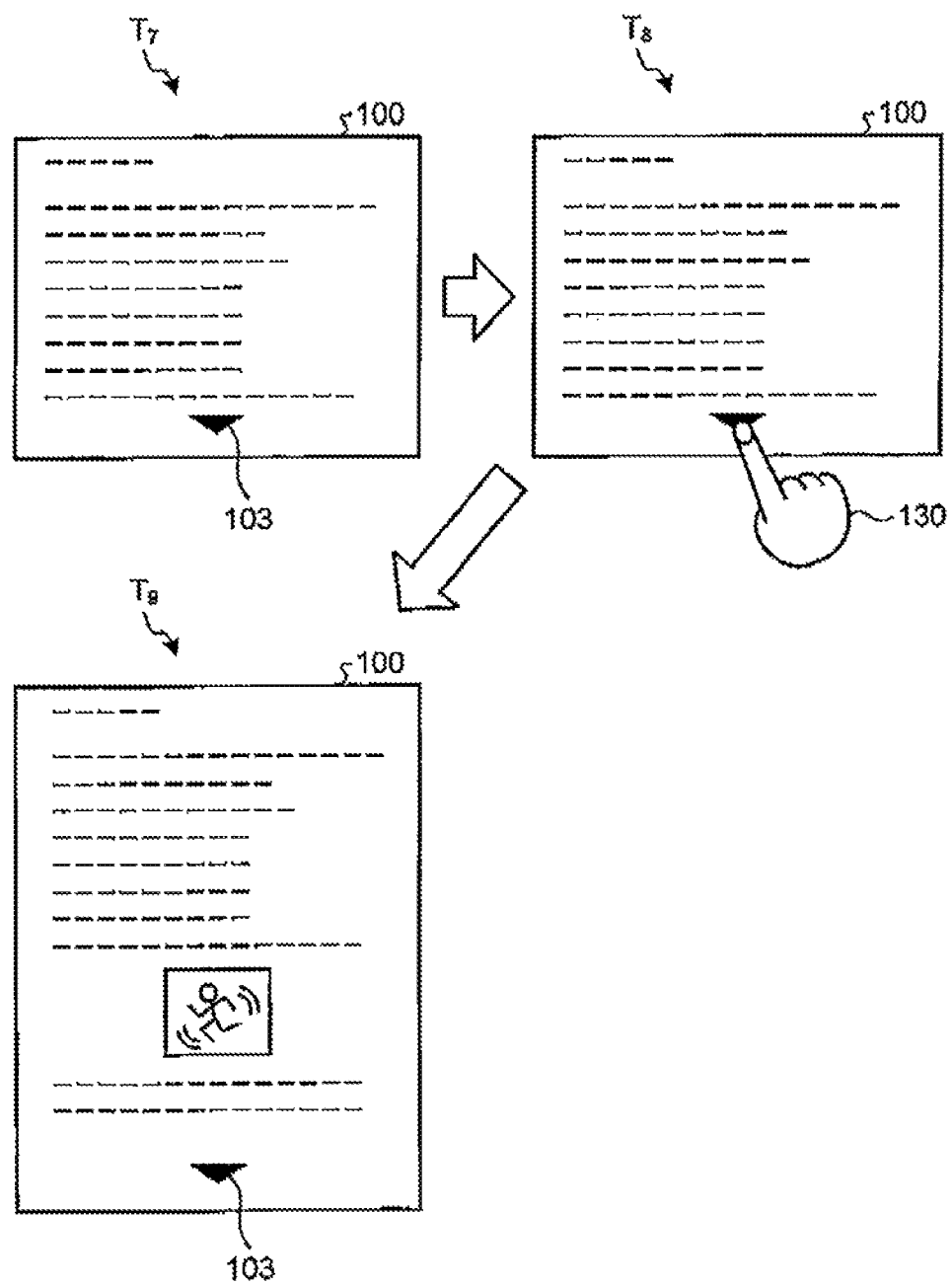
FIG. 12 is a view for explaining other pieces of processing that are executed by a determination unit and a video control unit.

For example, a button 103 for receiving a request to reload the subsequent matters of the content 100 is displayed on the user terminal 30 at a time $T_7$ in FIG. 12. When the user touches the button 103 and the user terminal 30 receives the request to reload the subsequent matters of the content 100 from the user at a subsequent time $T_8$, the subsequent matters of the content 100 are reloaded. In this case, the determination unit 303 determines that the subsequent matters of the content have been reloaded. Thereafter, the video control unit 305 starts playback of the video advertisement on the predetermined portion (for example, head portion) of the reloaded subsequent matters of the content at a time $T_9$ in FIG. 12. This enables the user terminal 30 to play back the video advertisement under a condition where the user views the video advertisement highly possibly.

Furthermore, in the first embodiment and the second embodiment, the read time calculation unit of the distribution device counts the number of characters from the head of the content to the display area 102 on which the video is played back and calculates the time To by multiplying the counted number of characters by the read time per character. Alternatively, the read time calculation unit of the distribution device may count the number of characters from the head of the content to a predetermined line, and calculate the time $T_{end}$ by multiplying the counted number of characters by the read time per character by the method same as that in the first embodiment and the second embodiment. With this, when the display area 102 is included in the viewable area after the user reads the content displayed on the user terminal 30 by the first predetermined number of lines and scrolls the content displayed on the user terminal 30, the video can be played back at a timing at which the display area 102 is included in the viewable area. Accordingly, the video can be played back at an appropriate timing.

Furthermore, the read time calculation unit of the distribution device can also count the number of characters from the head of the content to the end of the content, and calculate the time $T_{end}$ by multiplying the counted number of characters by the read time per character by the method same as that in the first embodiment and the second embodiment. With this, the video can be played back at a timing at which the user has read all the characters in the content displayed on the user terminal 30. In other words, the video can be played back at a good timing at which the user has read all the characters in the content. Accordingly, the video can be played back at an appropriate timing.

In the first embodiment and the second embodiment, the determination unit 303 repeatedly determines whether the time $T_{end}$ has passed from the start of the display of the content 100 until it determines that the time $T_{end}$ has passed. Alternatively, the determination unit 303 can also determine whether the time $T_{end}$ has passed from a timing described later. That is to say, when the content 100 is displayed on the user terminal 30, the determination unit 303 detects a sight line direction of the user from an image obtained by an in-camera provided on the user terminal 30. Then, the determination-unit 303 determines whether the user's face is directed to the screen of the user terminal 30 based on the detected sight line direction of the user. When it is determined that the user's face is directed to the screen of the user terminal 30, the determination unit 303 repeatedly determines whether the time $T_{end}$ has passed from the timing at which it is determined that the user's face is directed to the screen of the user terminal 30 until it determines that the time $T_{end}$ has passed. With this processing, the determination unit 303 determines whether the time $T_{end}$ has passed after detecting that the user views the content 100, so that the video can be played back at a more appropriate timing.

In the first embodiment and the second embodiment, the read time calculation unit of the distribution device calculates the time $T_{end}$. Alternatively, the configuration in which the user terminal 30 includes a read time calculation unit and the read time calculation unit calculates the time $T_{end}$ in the same manner may be employed.

Figure 13:
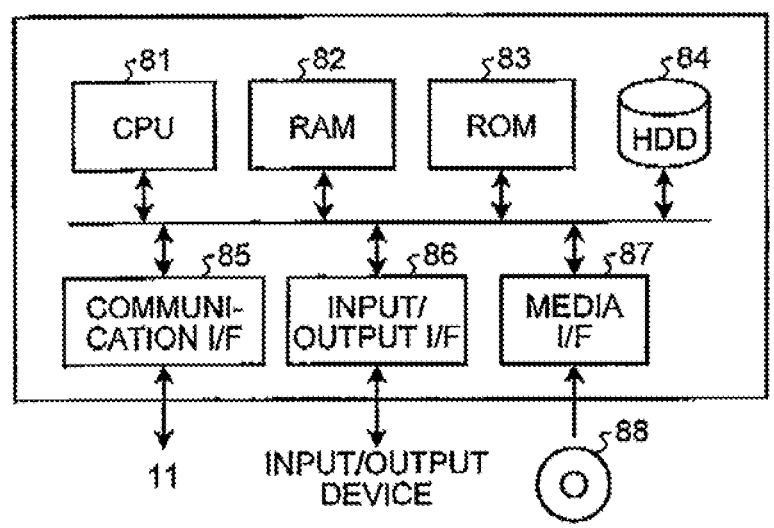
FIG. 13 is a hardware configuration diagram illustrating an example of a computer that executes functions of a distribution device.

The distribution device 20 in the first embodiment and the second embodiment is made to function by a computer 80 having the configuration as illustrated in FIG. 13, for example. FIG. 13 is a hardware configuration diagram illustrating an example of the computer that executes the functions of the distribution device. The computer 80 includes a central processing unit (CPU) 81, a random access memory (RAM) 82, a read only memory (ROM) 83, a hard disk drive (HDD) 84, a communication interface (I/F) 85, an input/output interface (I/F) 86, and a media interface (I/F) 87.

The CPU 81 operates based on programs stored in the ROM 83 or the HDD 84 so as to control the respective components. The ROM 83 stores therein a boot program that is executed by the CPU 81 when the computer 80 is activated, a program depending on the hardware of the computer 80, and the like.

The HDD 84 stores therein the program that is executed by the CPU 81 and data that is used by the program. The communication interface 85 receives data from another device through the communication circuit 11 and transmits it to the CPU 81, and transmits the data generated by the CPU 81 to another device through the communication circuit 11.

The CPU 81 controls an output device such as a display and a printer and an input device such as a keyboard and a mouse through the input/output interface 86. The CPU 81 acquires the data from the input device through the input/output interface 86. Furthermore, the CPU 81 outputs the generated data to the output device through the input/output interface 86.

The media interface 87 reads a program or data stored in a recording medium 88 and provides it to the CPU 81 through the RAM 82. The CPU 81 loads the program on the RAM 82 from the recording medium 88 through the media interface 87 and executes the loaded program. The recording medium 88 is an optical recording medium such as a digital versatile disc (DVD) and a phase change rewritable disc (PD), a magneto-optical recording medium such as a magneto-optical disc (MO), a tape medium, a magnetic recording medium, a semiconductor memory, or the like.

When the computer 80 functions as the distribution device 20 in the first embodiment and the second embodiment, the CPU 81 of the computer 80 executes programs loaded on the RAM 82 so as to execute the respective functions of the content data storage unit 21 and the distribution unit 22. Furthermore, the HDD 84 stores therein pieces of data in the content data storage unit 21.

The CPU 81 of the computer 80 reads the programs from the recording medium 88 and executes them. As another example, the CPU 81 of the computer 80 may acquire the programs from another device through the communication circuit 11.

In the distribution device 20 in the first embodiment and the second embodiment, the CPU in the user terminal 30 reads the content control programs included in the respective contents stored in the content data storage unit 21, so that the user terminal 30 executes the respective functions of the determination unit 303 and the video control unit 305.

According to the invention, a video can be played back at an appropriate timing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A digital media playback instruction distribution device comprising:
    a network interface;
    a memory storing content data, the content data including website content for distribution to a remote terminal, the website content including a display area for displaying digital media; and
    a processor operatively connected to the network interface and the memory, the processor being programmed to:
        receive, via the network interface, a request for the stored web content from the remote terminal;
        calculate a time period over which a user of the remote terminal is estimated to need to browse the website content when it is rendered on the remote terminal; and
        transmit, via the network interface, the website content and a delay instruction to the remote terminal, the delay instruction instructing the remote terminal to delay playback of digital media displayed in the display area until after the calculated time period has elapsed since display of the website content on the remote terminal.

2. The digital media playback instruction distribution device according to claim 1, wherein the processor is programmed to:
    access a read time per character;
    determine the number of characters in the website content from a beginning of the content until the display area; and
    calculate the time period by multiplying the determined number of characters by the accessed read time per character.

3. The digital media playback instruction distribution device according to claim 1, wherein the processor is programmed to:
    access a read time per character;
    determine the number of characters in the website content from a beginning of the content until a predetermined line in the website content; and
    calculate the time period by multiplying the determined number of characters by the accessed read time per character.

4. The digital media playback instruction distribution device according to claim 1, wherein the processor is programmed to:
    access a read time per character;
    determine the number of characters in the website content from a beginning of the content until an end of the content; and
    calculate the time period by multiplying the determined number of characters by the accessed read time per character.

5. The digital media playback instruction distribution device according to claim 2, wherein the read time per character is predetermined.

6. The digital media playback instruction distribution device according to claim 3, wherein the read time per character is predetermined.

7. The digital media playback instruction distribution device according to claim 4, wherein the read time per character is predetermined.

8. The digital media playback instruction distribution device according to claim 2, wherein the read time per character is set based on a browsing history of the user.

9. The digital media playback instruction distribution device according to claim 3, wherein the read time per character is set based on a browsing history of the user.

10. The digital media playback instruction distribution device according to claim 4, wherein the read time per character is set based on a browsing history of the user.

11. The digital media playback instruction distribution device according to claim 1, wherein, when the website content includes a thumbnail image, the time period is set to be 0.

12. The digital media playback instruction distribution device according to claim 1, wherein, when the website content includes a plurality of articles, the number of characters in the website content is determined based on a longest one of the article.

13. The digital media playback instruction distribution device according to claim 1, wherein
the delay instruction instructs playback of the digital media on a display area in subsequently loaded website content when the remote terminal detects that the subsequently loaded website content was loaded before playback of the digital media.

14. The digital media playback instruction distribution device according to claim 1, wherein the delay instruction delays playback of digital media displayed in the display area until after the calculated time period has elapsed since the user terminal detects that a user's face is facing the remote terminal.

15. A digital media playback instruction distribution method comprising:
accessing a memory storing content data, the content data including website content for distribution to a remote terminal, the website content including a display area for displaying digital media;
receiving, via a network interface, a request for the stored web content from the remote terminal;
calculating a time period over which a user of the remote terminal is estimated to need to browse the website content when it is rendered on the remote terminal, and
transmitting, via the network interface, the website content and a delay instruction to the remote terminal, the delay instruction instructing the remote terminal to delay playback of digital media displayed in the display area until after the calculated time period has elapsed since display of the website content on the remote terminal.

16. A non-transitory computer-readable storage medium with an executable digital media playback instruction program, the program comprising instructions that cause the computer to perform the following functions:
accessing a memory storing content data, the content data including website content for distribution to a remote terminal, the website content including a display area for displaying digital media;
receiving, via the network interface, a request for the stored web content from the remote terminal;
calculating a time period over which a user of the remote terminal is estimated to need to browse the website content when it is rendered on the remote terminal; and
transmitting, via the network interface, the website content and a delay instruction to the remote terminal, the delay instruction instructing the remote terminal to delay playback of digital media displayed in the display area until after the calculated time period has elapsed since display of the website content on the remote terminal.

* * * * *